(12) United States Patent
Inui et al.

(10) Patent No.: US 6,249,658 B1
(45) Date of Patent: Jun. 19, 2001

(54) IMAGE FORMING APPARATUS CAPABLE OF INDEPENDENTLY PROCESSING MULTIPLE JOBS

(75) Inventors: Kazuo Inui, Toyohashi; Junko Takuwa, Nishinomiya; Hiroshi Sumiyama, Aichi-ken, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/495,297

(22) Filed: Feb. 1, 2000

(30) Foreign Application Priority Data

Feb. 1, 1999 (JP) .................................................. 11-024244

(51) Int. Cl.[7] .............................. G03G 15/00; G06F 9/46
(52) U.S. Cl. ................................ 399/82; 399/43; 399/81; 399/369
(58) Field of Search ..................................... 399/38, 43, 81, 399/82, 83, 85, 367, 369; 358/296, 401

(56) References Cited

U.S. PATENT DOCUMENTS

| | | | |
|---|---|---|---|
| 4,816,864 | * 3/1989 | Tanaka et al. | 399/81 |
| 4,845,527 | 7/1989 | Maruta et al. | 399/82 |
| 5,546,166 | 8/1996 | Hirota et al. | 399/43 |
| 5,960,247 | * 9/1999 | Morikawa | 399/43 X |
| 5,995,779 | * 11/1999 | Natsume et al. | 399/82 |
| 6,014,528 | * 1/2000 | Natsume et al. | 399/82 X |

* cited by examiner

Primary Examiner—Sophia S. Chen
(74) Attorney, Agent, or Firm—Morrison & Foerster LLP

(57) ABSTRACT

An image forming apparatus such as digital copying machine can perform an operation to read the original document by an image reader and an operation to output image data stored in an image memory by a printer, independently of each other. A first timer measures a period of time that has elapsed since the suspension of reading of the original document by the image reader. A second timer measures a period of time that has elapsed since the suspension of output of image data stored in the image by the printer. The timers running independently of each other. Therefore even when one of the processes is continuing, if the other process is suspended due to either intentional discontinuation or an error, this other process may be cleared. As a result, an operator who wishes to input a job to the digital copying machine can learn the current status of each job residing in the digital copying machine.

20 Claims, 14 Drawing Sheets

→ : Image Data Flow

IMAGE FORMING APPARATUS CAPABLE OF INDEPENDENTLY PROCESSING MULTIPLE JOBS

This application is based on application No. 11-24244 filed in Japan, the contents of which is hereby incorporated by reference.

BACKGROUND OF THE INVENTION

1. Field of the Invention

The present invention pertains to an image forming apparatus, and more particularly, to an image forming apparatus capable of independently processing multiple jobs in which images are output.

2. Description of the Related Art

Image forming apparatuses are conventionally known that can independently perform reading of original documents and printing of another documents. An image forming apparatus of this type can input into itself a second job while a first job, comprising copying of original documents, is being output. In addition, it has a function to automatically clear the specified copy mode when no part of the apparatus is in operation or when no setting is being made by the operator.

However, in this conventional image forming apparatus, as long as the job to output copies of the original document is being processed, the existing copy mode is not cleared, even when the job to read an original document is left unattended with the copy mode setting unfinished. Therefore, if another operator tries to operate the image forming apparatus, because the job to input the original document is left unattended with its half-completed copy mode settings, the operator cannot determine whether or not the image forming apparatus is available. This leads to the problem that where the image forming apparatus is left unattended with unfinished copy mode settings in this way, another operator cannot use the apparatus for a long time.

SUMMARY OF THE INVENTION

The present invention was created in order to eliminate this problem. The object of the present invention is to provide an image forming apparatus that can separately measure the period of time that a reading process or printing process is suspended.

In order to attain this object, the first aspect of the image forming apparatus comprises a memory, an input unit which inputs a first image group to the memory, an output unit which outputs a second image group stored in the memory independently of the first image group input process by the input unit, a first timer which measures a period of time that has elapsed since the first image group input process is suspended and a second timer which measures a period of time that has elapsed since the second image group output process is suspended.

The second aspect of the image forming apparatus comprises a plurality of original document trays, a copying device which copies original documents placed on the original document trays, an operating member which sets copying parameters for each of the original document trays, a timer which measures a period of time that has elapsed since the parameters are set by the operating member, a detector which detects that an original document is placed on the original document tray for which the parameters have been set and a clearing means for clearing the parameters set by the operating member, when the period of time measured by the timer has exceeded a prescribed period of time before the detector detects placement of the original document.

The third aspect of the image forming apparatus comprises a memory, an input unit which inputs an image group for a first job, a printer which prints an image group for a second job stored in the memory independently of the input operation regarding the first job performed by the input unit, a first timer which measures a period of time that has elapsed since the input of the image group for the first job is suspended and a second timer which measures a period of time that has elapsed since the printing of the image group for the second job is suspended.

Using these aspects of the present invention, an image forming apparatus may be provided that is capable of measuring the period of time that has elapsed since the suspension of processing of an image group for either the input means or the output means.

These and other objects, advantages and features of the invention will become apparent from the following description thereof taken in conjunction with the accompanying drawings which illustrate specific embodiments of the invention.

BRIEF DESCRIPTION OF THE DARWINGS

In the following description, like parts are designated by like reference numbers throughout the several drawings.

Figure 6A:
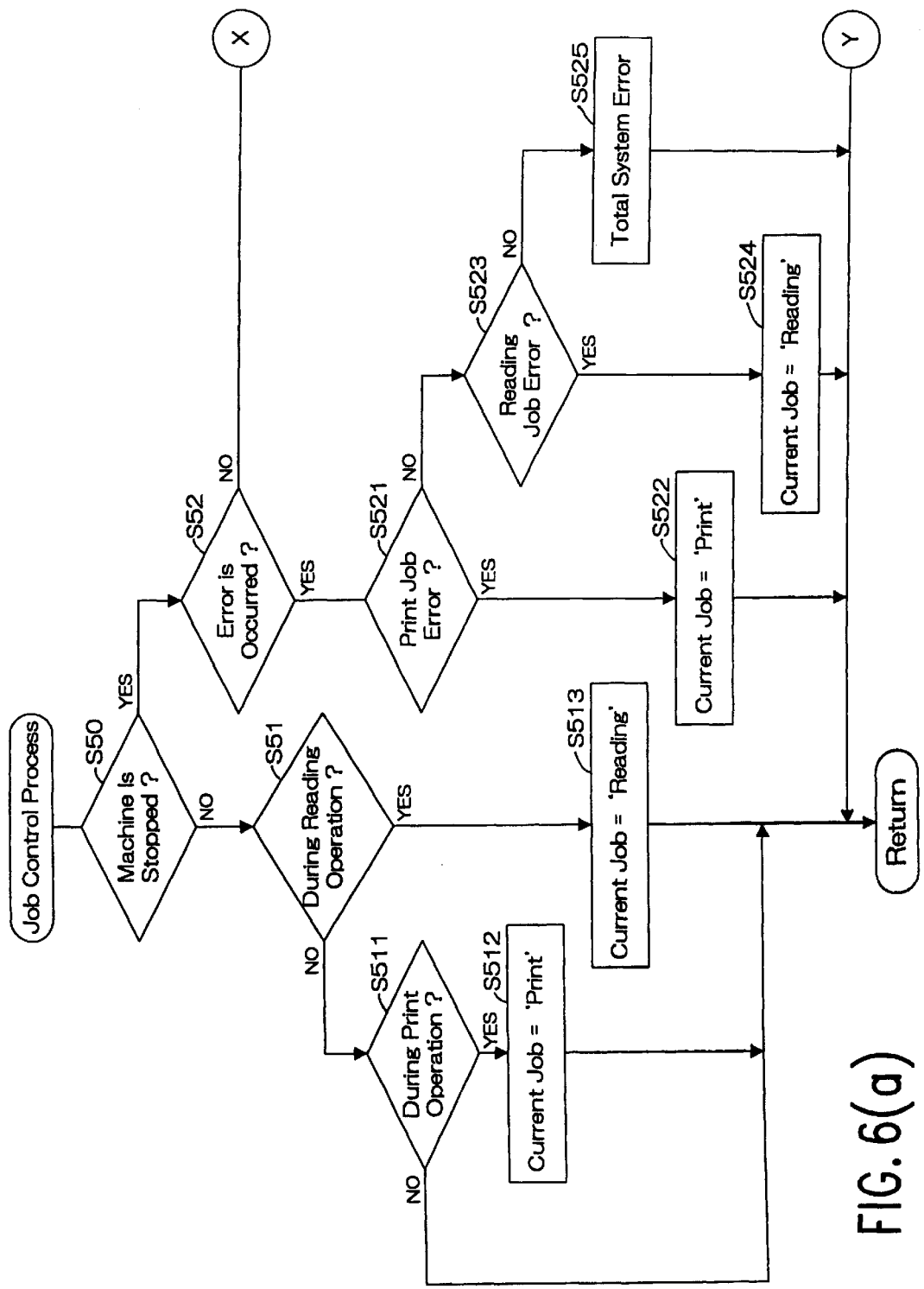
Figure 6B:
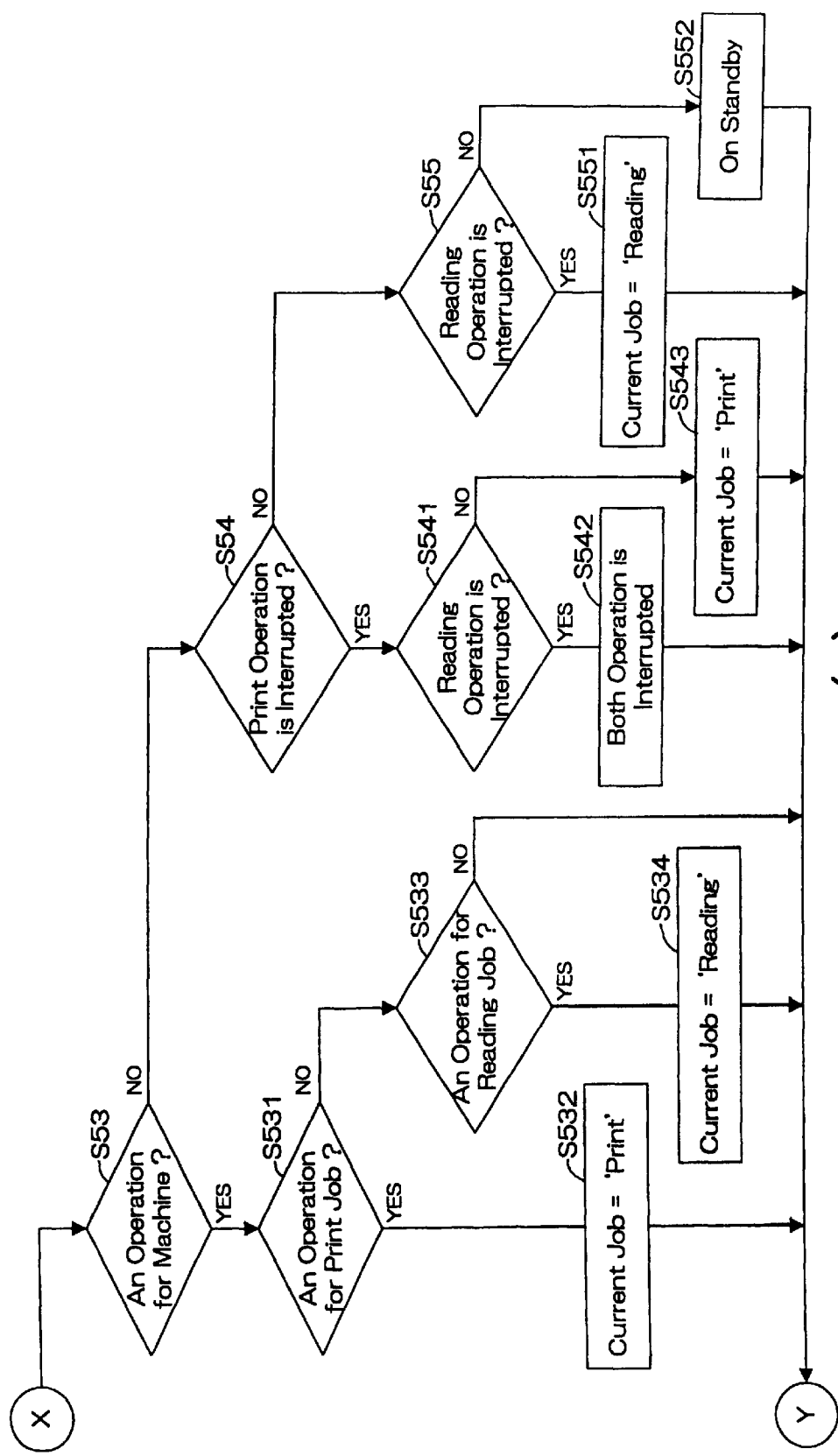

FIGS. 6(a) and 6(b) is a flow chart to show the sequence of the job control process.

Figure 7:
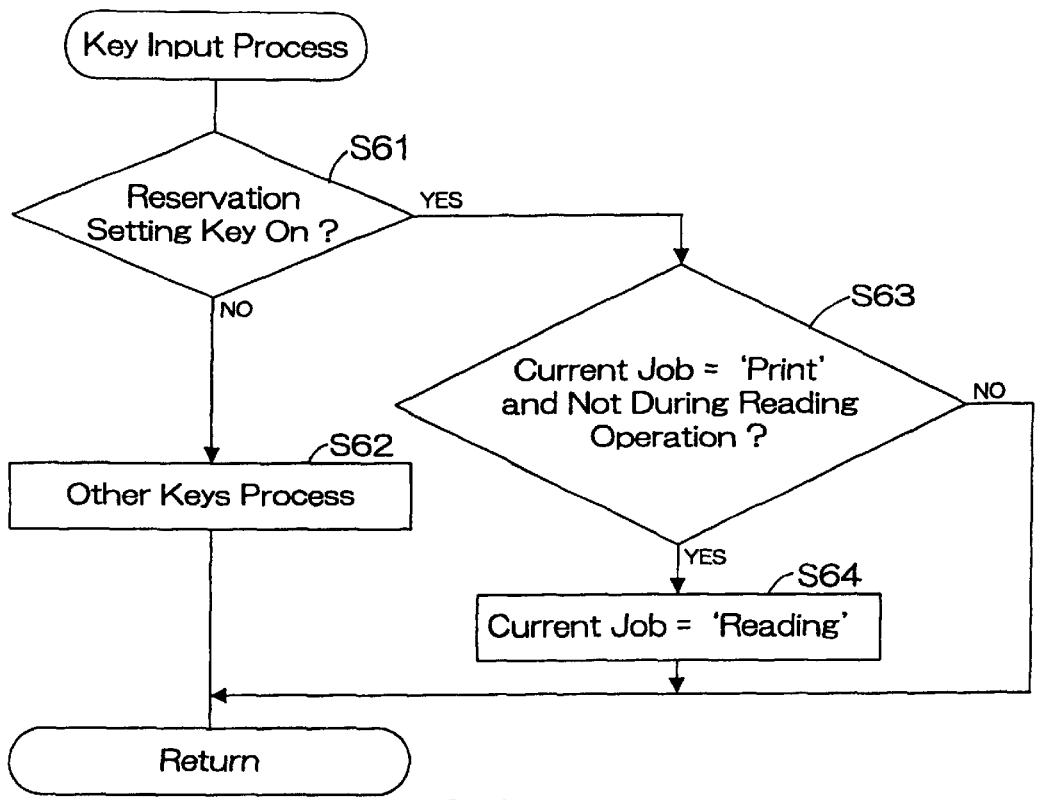

FIG. 7 is a flow chart to show the sequence of the key input process.

Figure 8:
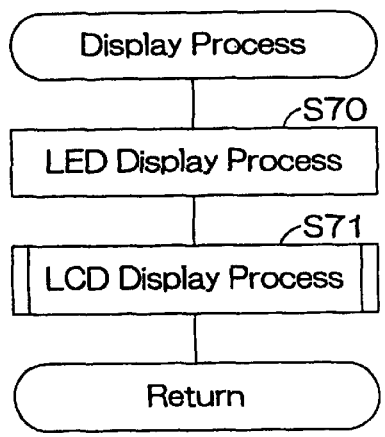

FIG. 8 is a flow chart to show the sequence of the display process.

Figure 9:
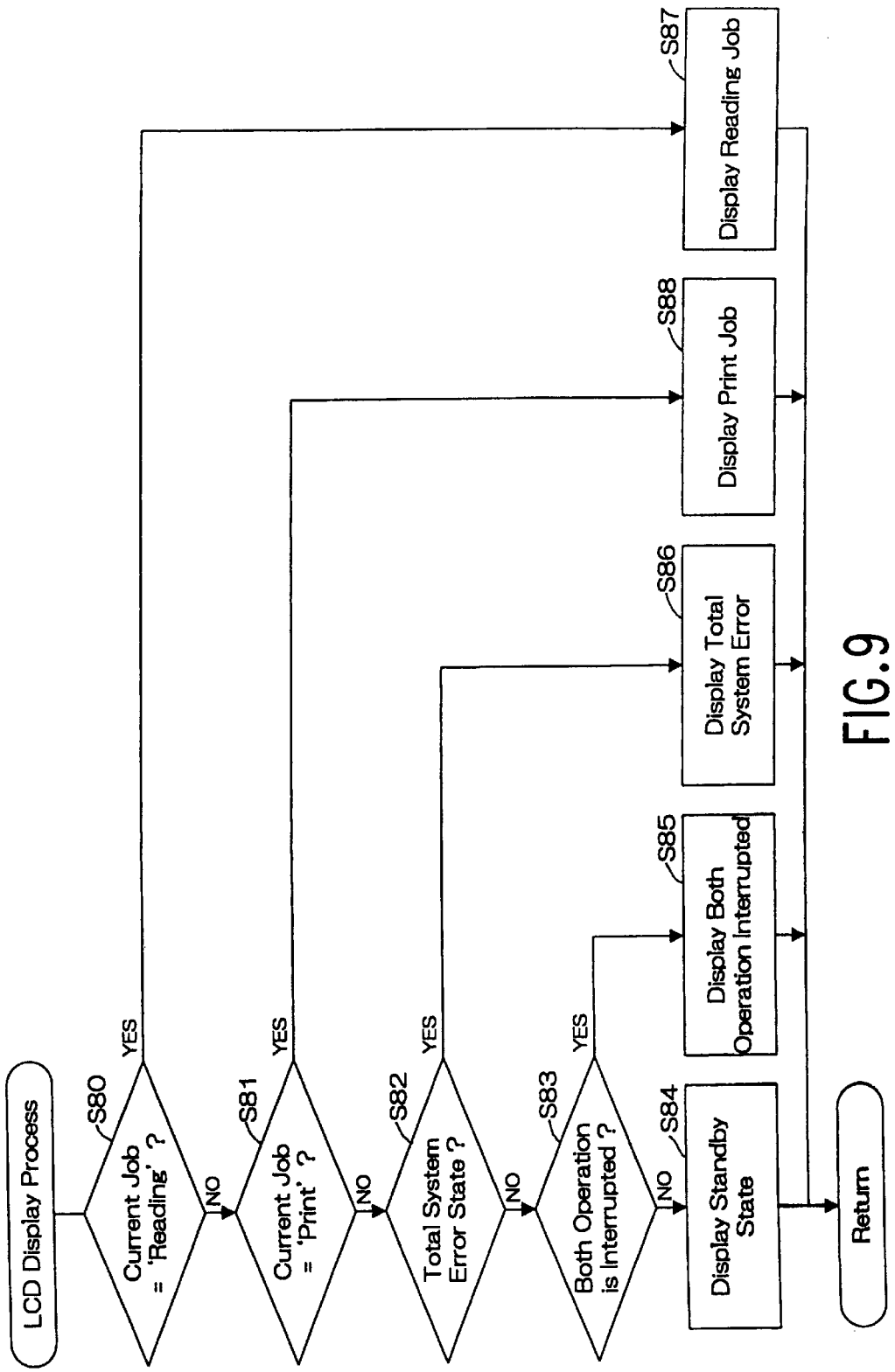

FIG. 9 is a flow chart to show the sequence of the LCD process.

Figure 10:
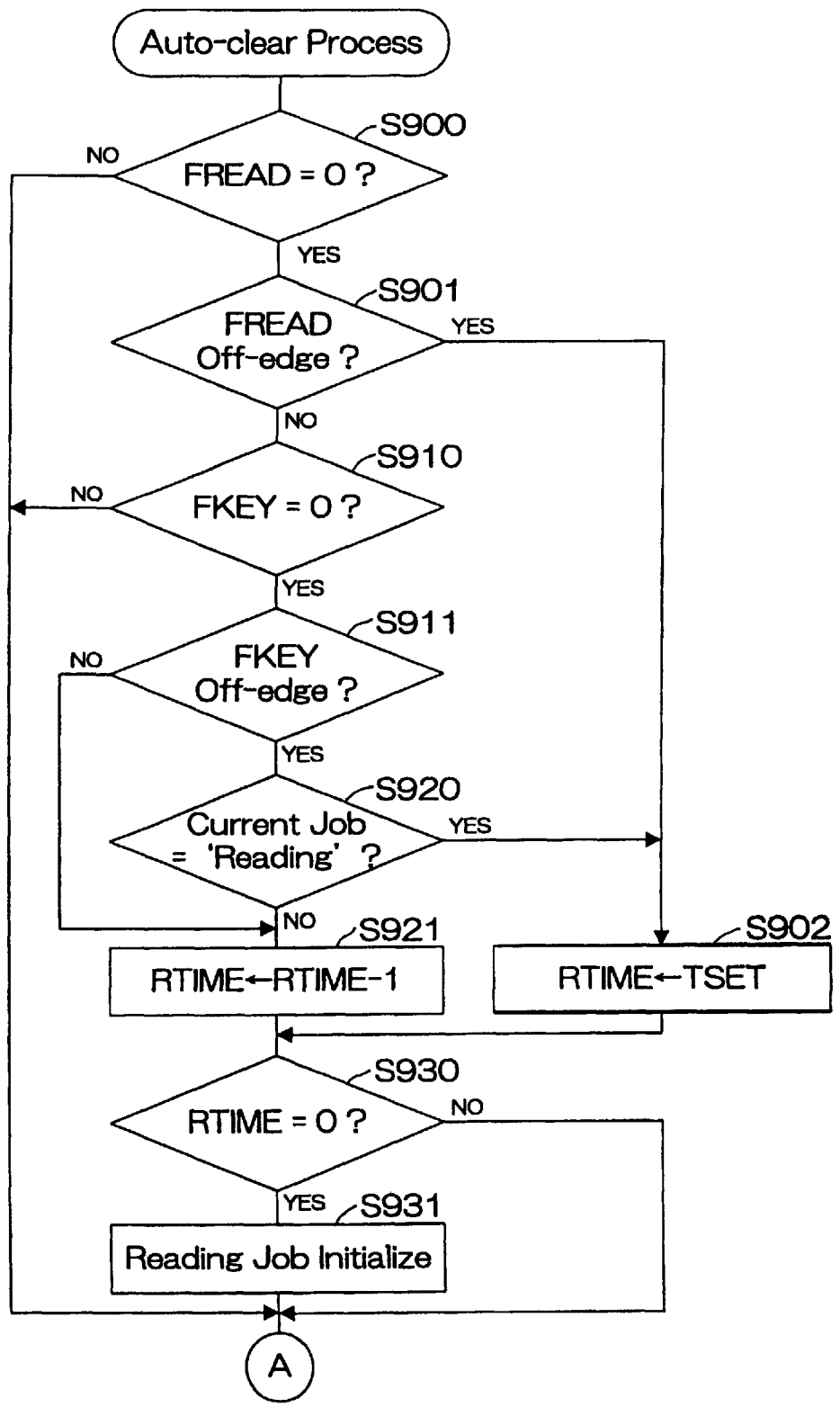

FIG. 10 is a first flow chart to show the sequence of the auto-clear process.

Figure 11:
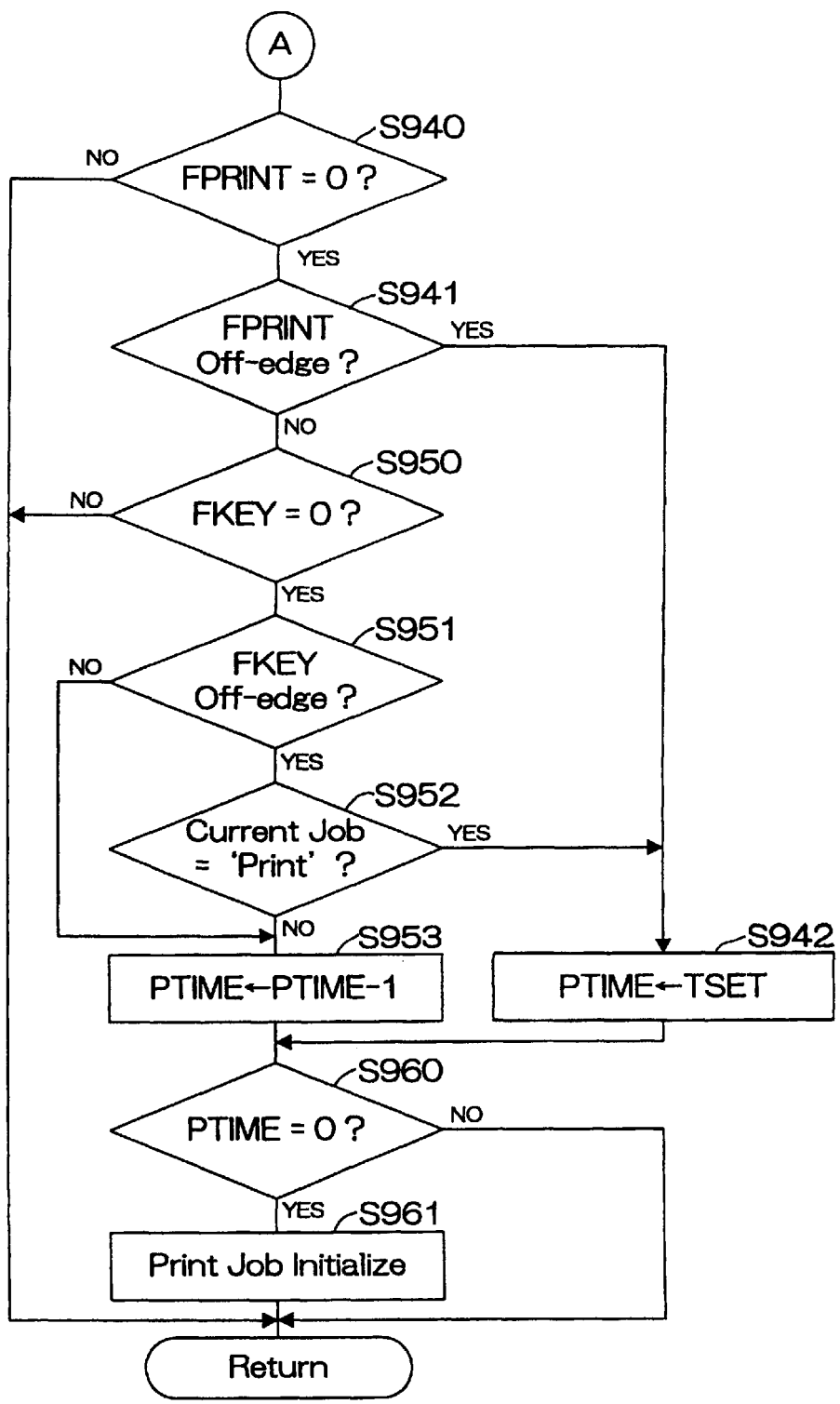

FIG. 11 is a second flow chart to show the sequence of the auto-clear process.

Figure 12:
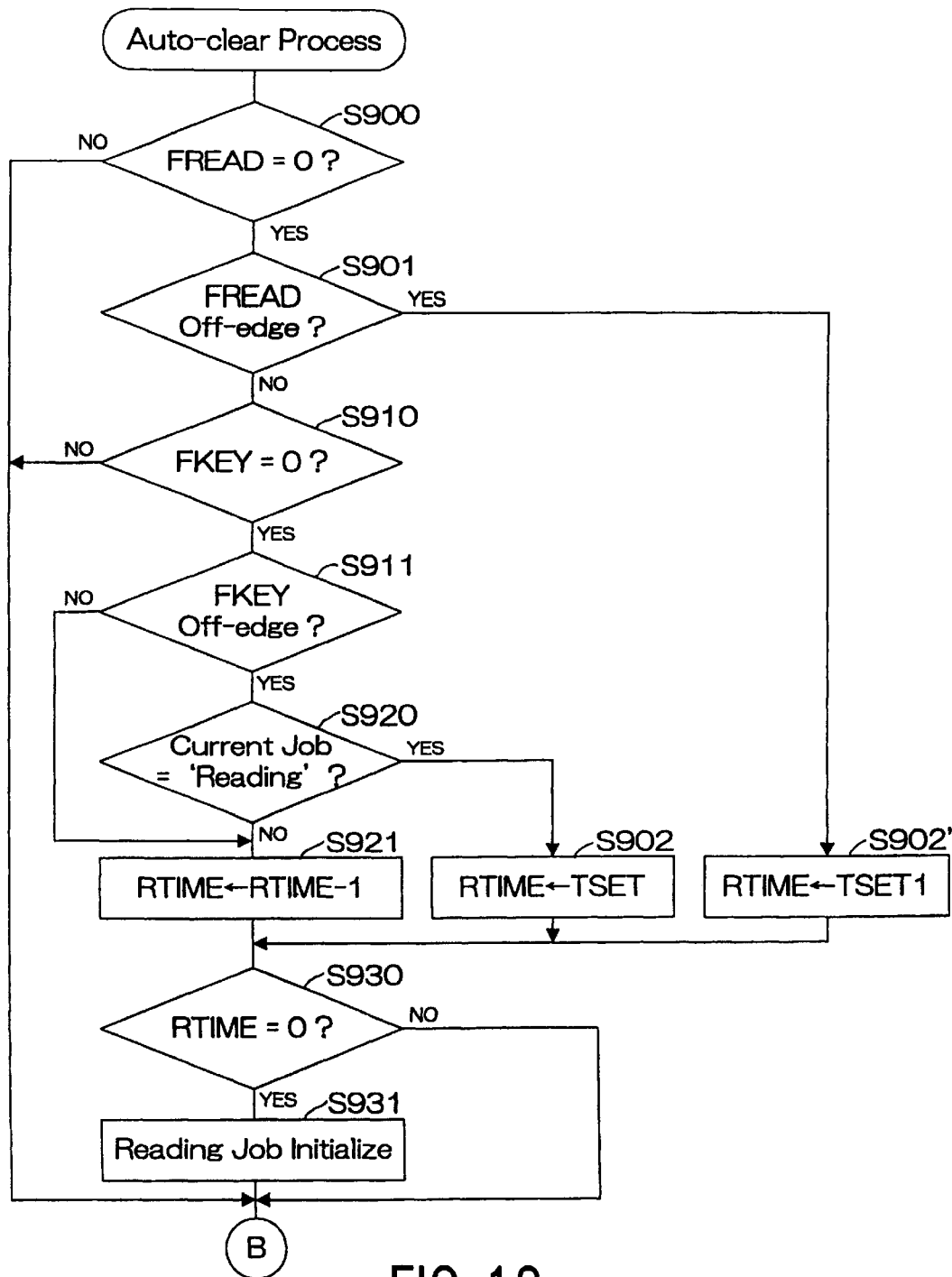

FIG. 12 is a first flow chart to show a modified version of the sequence of the auto-clear process.

Figure 13:
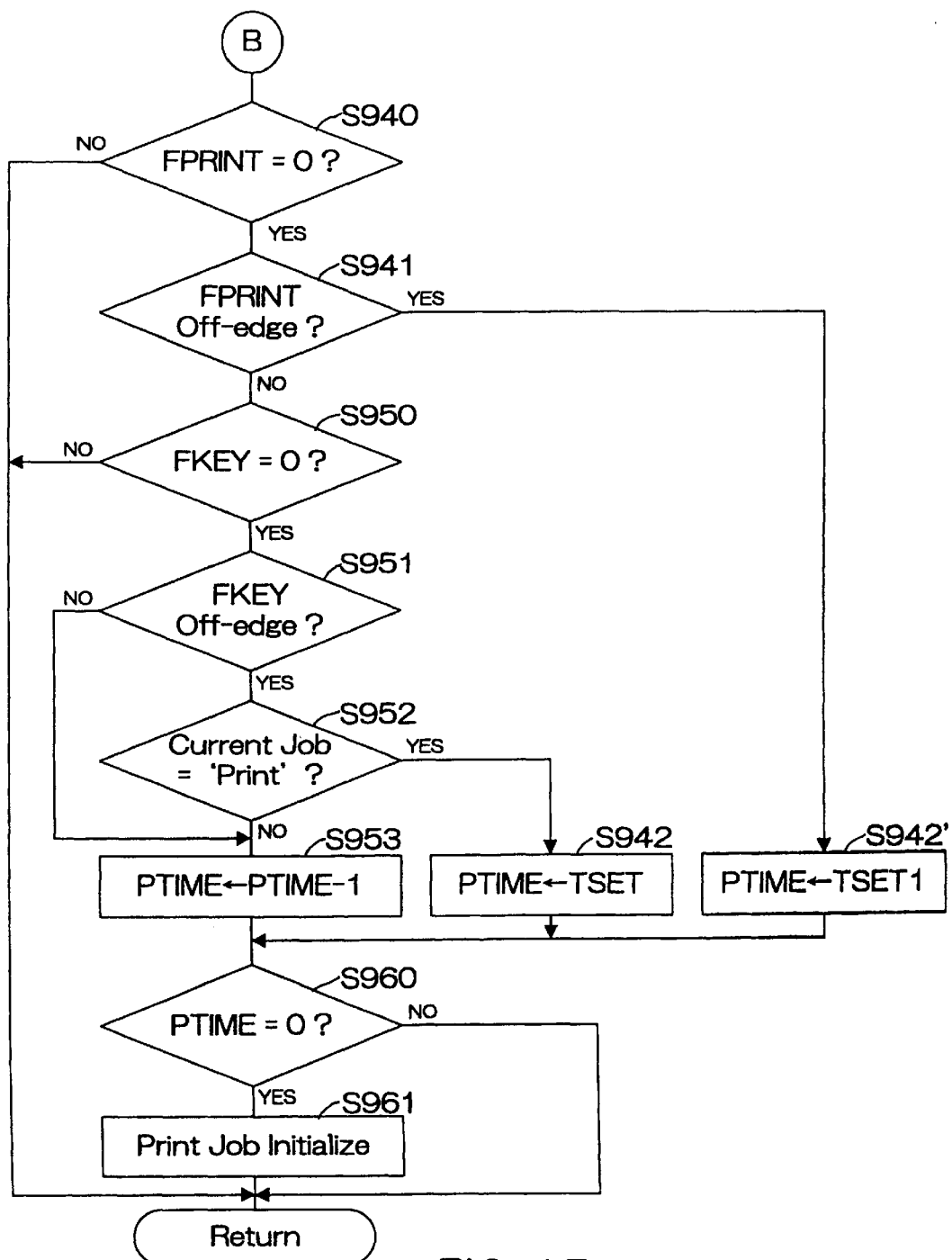

FIG. 13 is a second flow chart to show a modified version of the sequence of the auto-clear process.

Figure 14:
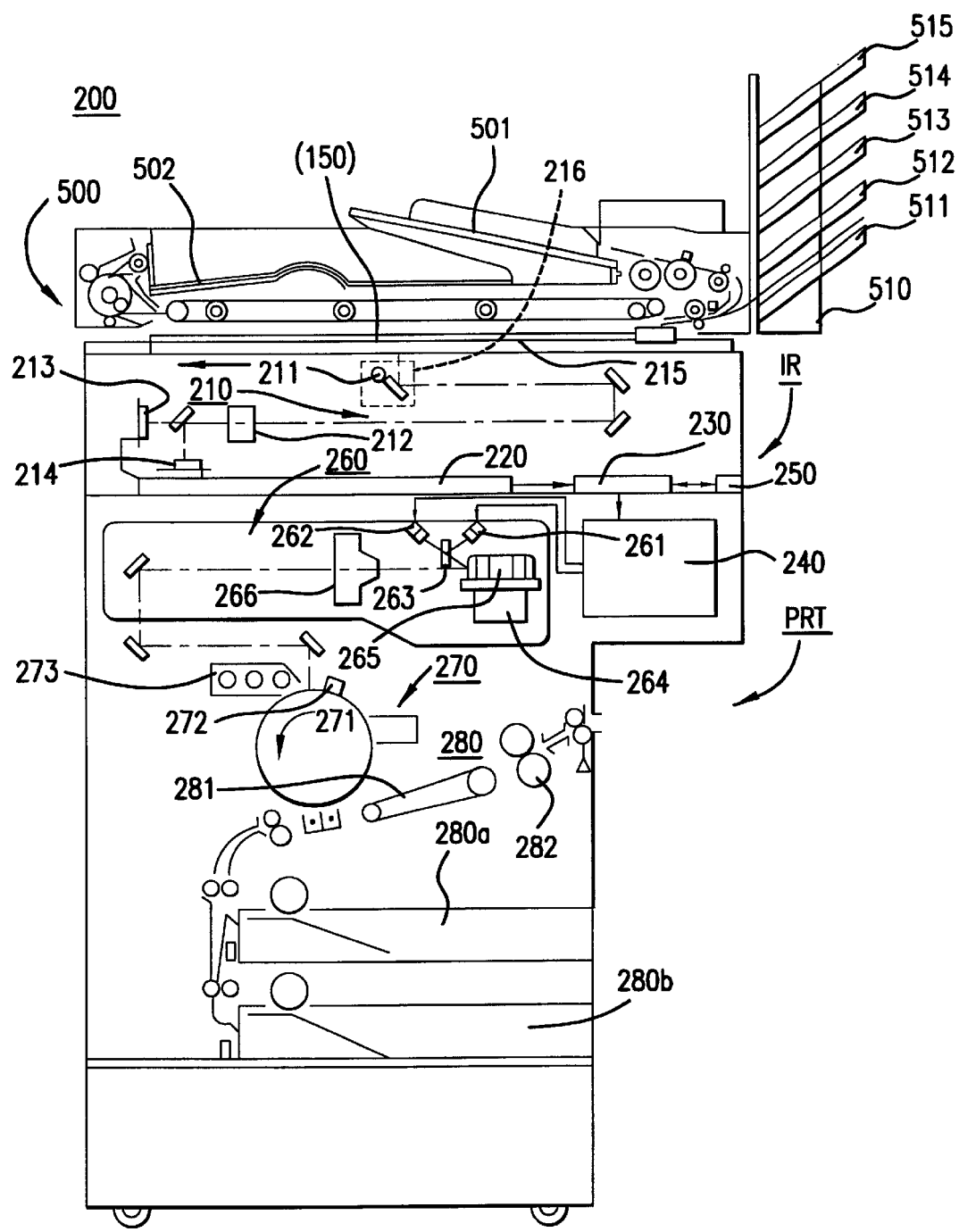

FIG. 14 is a simplified cross-sectional view showing the basic construction of the digital copying machine comprising a second embodiment.

Figure 15:
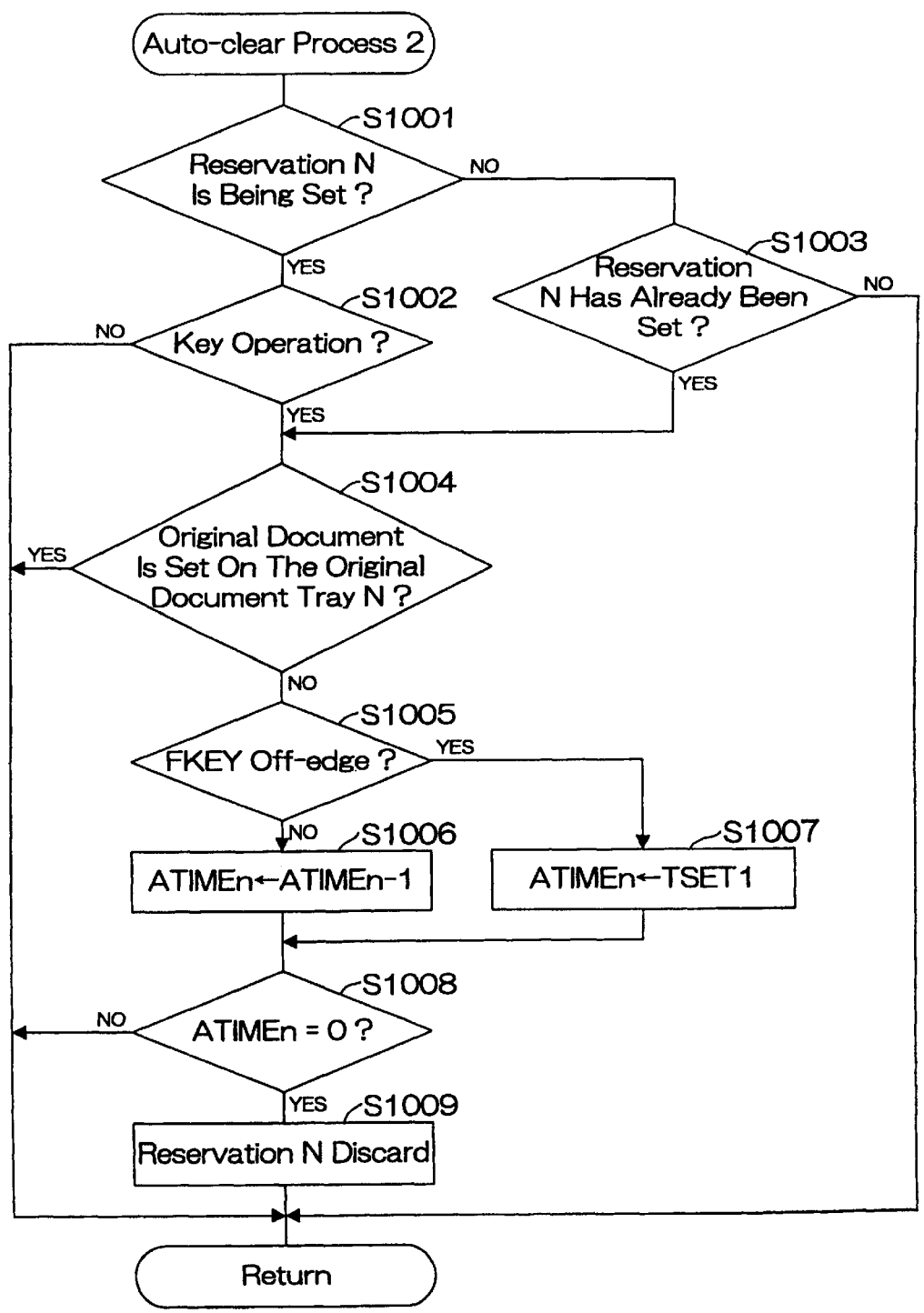

FIG. 15 is a flow chart to show the sequence of the auto-clear process performed by the digital copying machine comprising the second embodiment.

DESCRIPTION OF THE PREFERRED EMBODIMENTS

The embodiments of the present invention are explained below with reference to the drawings. In the drawings, the same numbers indicate identical or equivalent members.

[First Embodiment]

Figure 1:
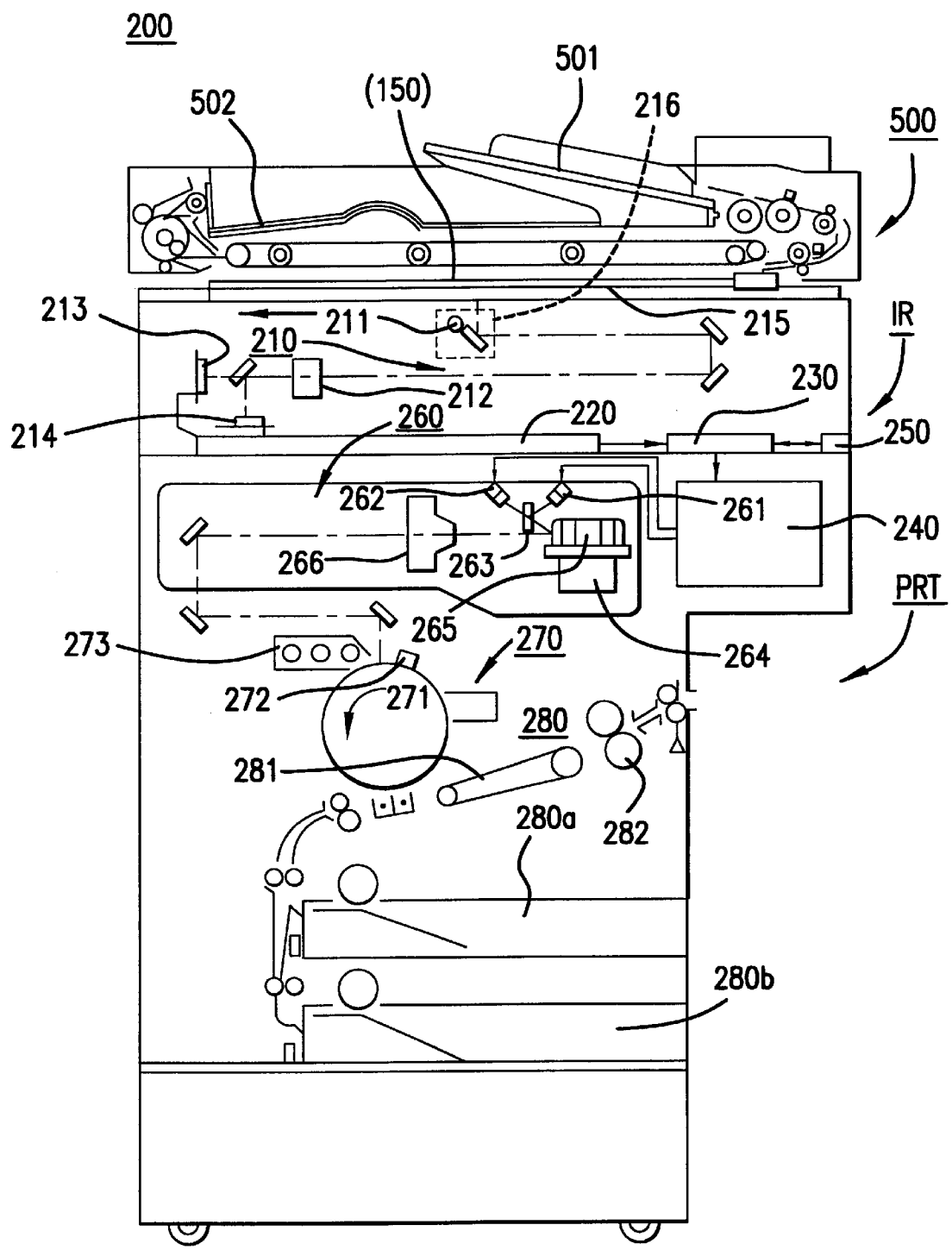
FIG. 1 is a simplified cross-sectional view showing the basic construction of the digital copying machine comprising a first embodiment.

FIG. 1 is a cross-sectional view showing the basic construction of the digital copying machine 200 comprising a first embodiment of the present invention. The digital copying machine 200 comprises an automatic original document feeder 500 that feeds the pages of the original document and turns them over when necessary, an image reader IR that reads the images of the original document and forms image data, an image memory 230 that temporarily stores the image data read by the image reader IR, a printer PRT that performs printing onto copy paper based on the image data stored in the image memory 230, an operation panel 150 used to perform inputting(located on the top surface of the digital copying machine 200), and an external I/O control unit 250 for the transmission and receipt of data to and from external devices.

The automatic original document feeder 500 automatically conveys the original document placed on the original document tray 501 to the reading position on the platen glass 215 on a page-by-page basis starting with the very bottom page, and when reading by the image reader IR is completed, the original document pages are ejected onto the paper eject tray 502.

The image reader IR comprises a scanning system 210 and an image signal processing unit 220. In the scanning system 210, the image on the original document page set at the reading position is irradiated by an exposure lamp 211 mounted on the scanner 216 that moves underneath the page. The reflected light from the original document page is input in the photoelectric conversion elements 213 and 214 comprising CCD arrays, etc., via the reflection mirrors and converging lens 212. The signals obtained in this scanning system 210 are sent to the image signal processing unit 220. The image signal processing unit 220 performs image processing such as data binarization, image quality correction, magnification and image editing. The image data thus processed is then stored in the image memory 230.

The printer PRT comprises a print processing unit 240, an optical system 260, an image forming system 270 and a paper conveyance system 280. The print processing unit 240 drives the optical system 260 based on the image data from the image memory 230. In the optical system 260, semiconductor lasers 261 and 262 emit laser beams based on the signals controlled by the print processing unit 240. These beams are synthesized by a dichroic mirror 263, reflected by a polygon mirror 265 that rotates by means of a motor 264, and are directed toward the photoreceptor 271 in the image forming system 270 via a main lens 266.

In the image forming system 270, the photoreceptor 271 is charged by a charger 272 and is then irradiated by the laser beam from the optical system 260. This forms an electrostatic latent image on the photoreceptor 271. Toner is then placed on the electrostatic latent image by the developing unit 273. The toner image on the photoreceptor 271 is transferred onto a sheet of copy paper fed from the paper cassette 280a or 280b of the paper conveyance system 280. The sheet of copy paper is then conveyed to the fusing unit 282 by the paper conveyance belt 281, where the toner is bonded to the sheet by means of heat and pressure and the sheet is ejected onto a tray not shown in the drawing. Although not shown in the drawing, it is also acceptable if a sorter is used in place of the tray so that the ejected sheets of copy paper may be sorted after they are output.

The external I/O control unit 250 performs transmission and receipt of data between an externally connected personal computer, local area network (LAN) and public telephone network (PSTN) and the image memory 230. The external I/O control unit 250 comprises a communication control unit that mainly performs control of communication for the transmission and receipt of control signals and image data to and from the personal computer, a network control unit that performs control regarding control signals to and from external devices connected to the LAN as well as regarding transmission and receipt of image data, a facsimile converter that performs data transmission and receipt to and from the image memory 230 during facsimile operation and performs conversion of image density and encoding methods, and a G3 unit that performs modulation and demodulation of image data and control signals during facsimile operation and is connected to the telephone line to perform control of communication with the PSTN.

The image data input from an externally connected personal computer, etc. by means of the external I/O output control unit 250 is stored in the image memory 230. This means that image data read by the image reader IR and image data received by the external I/O output control unit 250 may be stored in the image memory 230.

Figure 2:
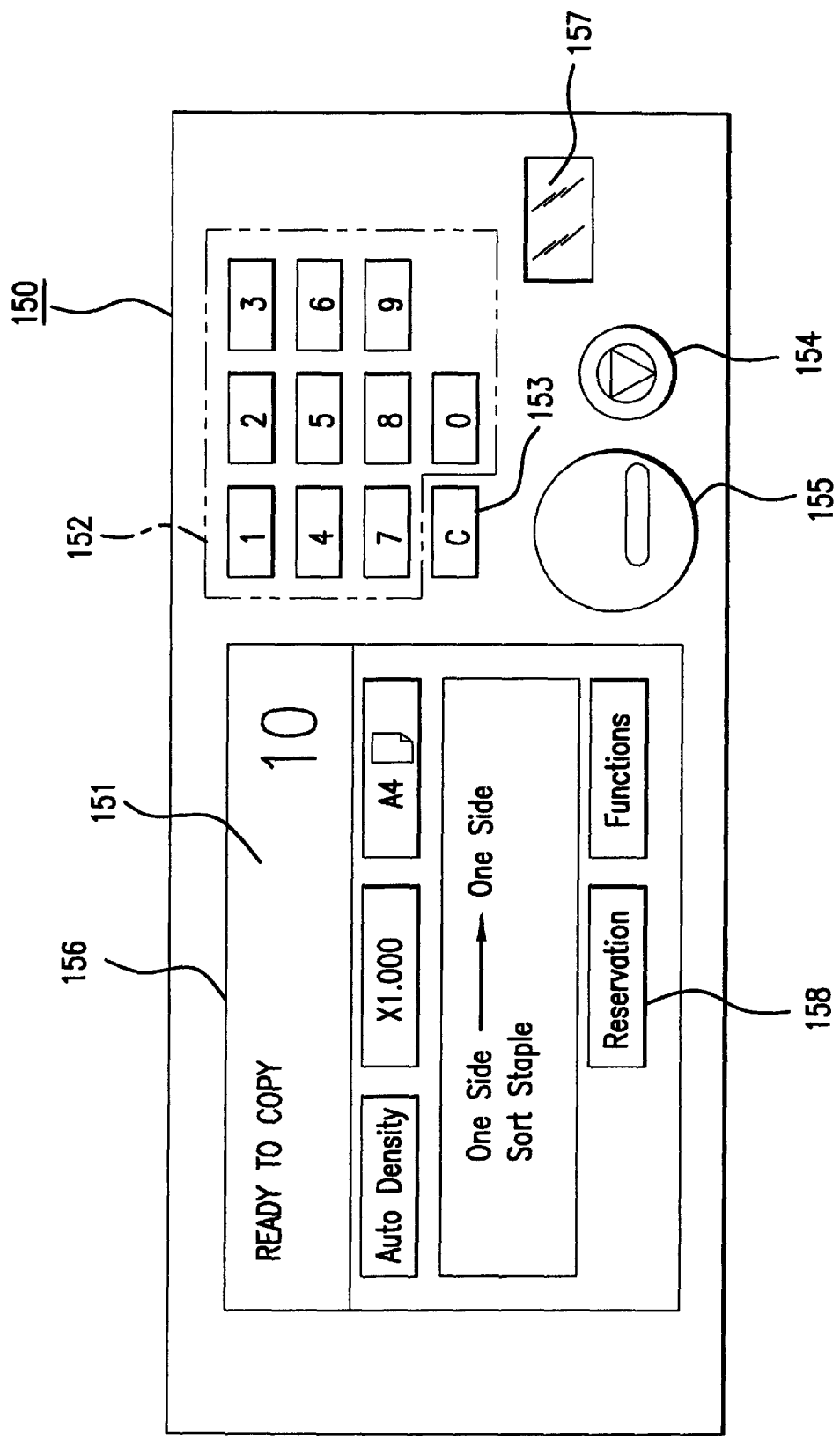
FIG. 2 is a plan view of the operation panel 150 located on the top surface of the digital copying machine 200.

FIG. 2 is a plan view to explain the construction of the operation panel 150 on the top surface of the digital copying machine 200. The operation panel 150 includes a liquid crystal display unit 156, a touch panel 151 comprising a clear member that is located over the liquid crystal display unit 156, a numerical keypad 152 to input such numbers as the desired number of copies and the magnification, a start key 155 to instruct the start of copying, a clear key 153 to clear the input numbers or discard the image data stored in the image memory 230, a panel reset key 157 to clear the operation mode being displayed in the liquid crystal display unit 156, and a stop key 154 to instruct the suspension of operation of the digital copying machine 200.

The status of the digital copying machine 200 interior and the operation mode may be displayed to the user by means of the liquid crystal display unit 156. A menu screen with which to set the operation mode of the digital copying machine 200 may also be displayed, such that when the user presses the touch panel 151, the operation mode may be input in accordance with the menu screen.

The screen example displayed in the liquid crystal display unit 156 shown in FIG. 2 shows a reservation setting button 158. By pressing this reservation setting button 158, a job different from the job regarding which the digital copying machine is performing printing may be specified.

Figure 3:
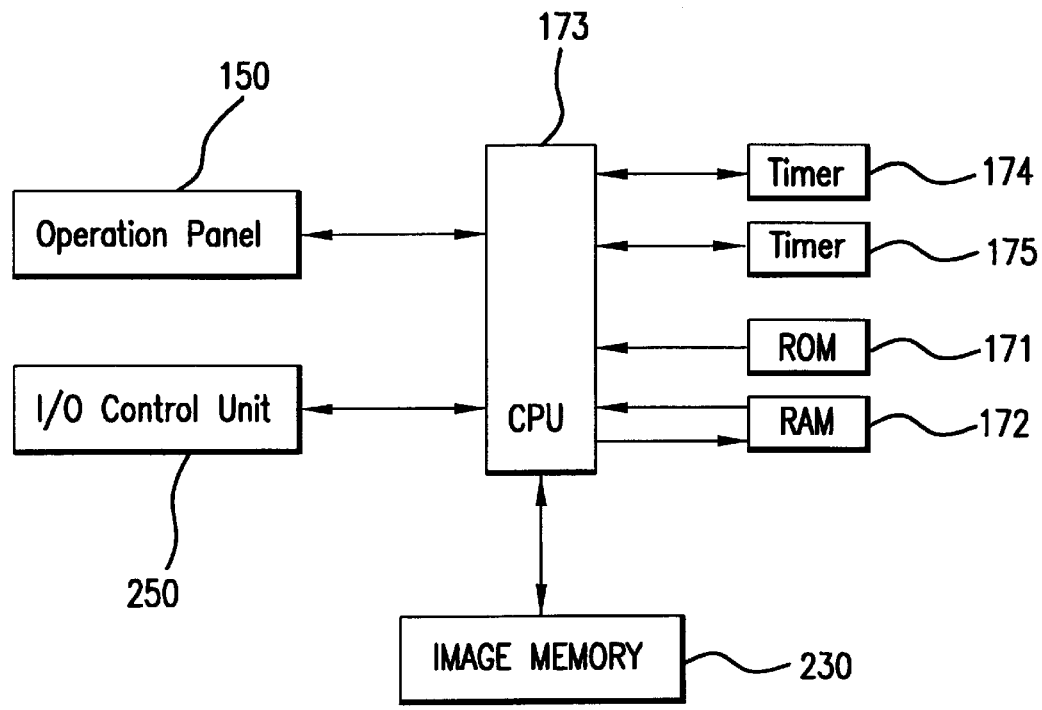
FIG. 3 is a block diagram showing the basic construction of the control unit of the digital copying machine 200.

FIG. 3 is a block diagram showing the basic construction of the control unit that controls the digital copying machine 200. With reference to this drawing, the control unit includes a CPU 173 to control the entire digital copying machine 200, a ROM 171 to store the programs executed by the CPU 173, a RAM 172 to store information needed for the CPU 173 to execute the programs, two timers 174 and 175, the operation panel 150 and the external I/O output control unit 250.

The timer 174 measures the period of time that has elapsed since the suspension of reading of the original document by means of the image reader IR. The timer 175 measures the period of time that has elapsed since the suspension of output when image data stored in the image memory 230 is output by the printer PRT.

The digital copying machine 200 constructed in this manner can perform an operation to read the original document by means of the image reader IR and an operation to output image data stored in the image memory 230 by means of the printer PRT, independently of each other. Multiple images may be stored in the image memory 230, such that multiple image groups obtained by reading original documents by means of the image reader IR may be separately stored in the image memory 230.

Figure 4:
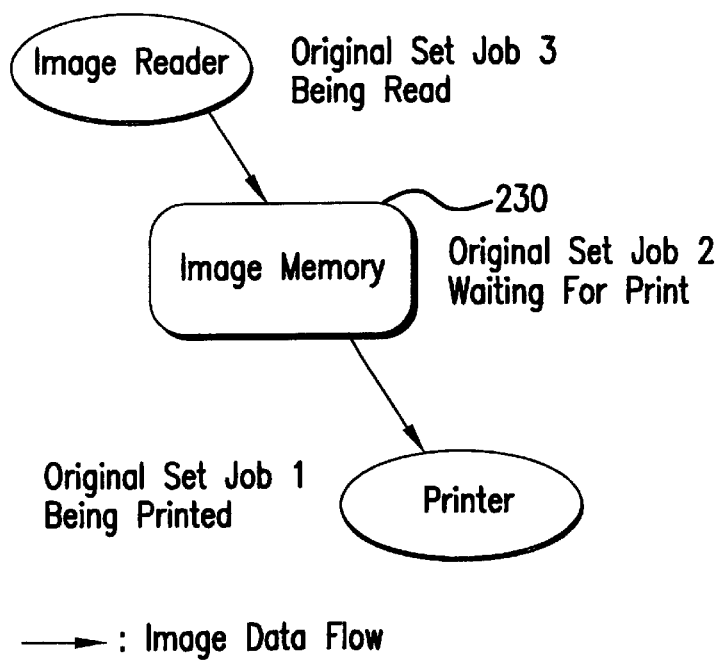
FIG. 4 is a simplified drawing to explain the multi-job operation.

As described above, the digital copying machine 200 is capable of performing multi-job operation. FIG. 4 is a simplified drawing to explain the multi-job operation performed by the digital copying machine 200. In an multi-job operation, while image data stored in the image memory 230 is being output by means of the printer PRT (Job 1), a different original document is read by means of the image reader IR (Job 3) and the read image data is stored in the image memory 230 independently of the printing. In other words, Job 1 in which image data stored in the image memory 230 is output by the printer PRT, and Job 3 in which an original document having nothing to do with Job 1 is read by the image reader IR, are performed simultaneously but independently. In addition, image data may be stored in the image memory 230 for each original document read by the image reader IR, such that image data stored in the image memory 230 becomes a standby job (Job 2) that is waiting to be output by the printer PRT.

Figure 5:
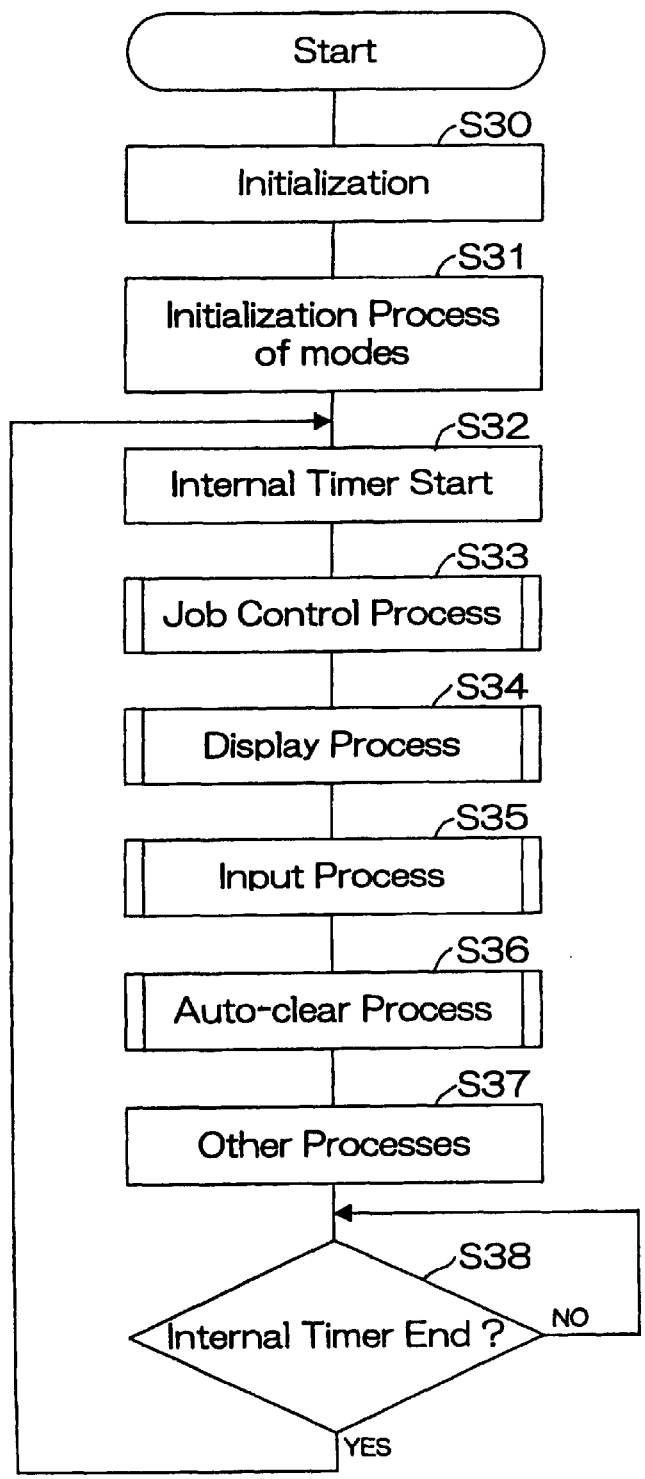
FIG. 5 is a flow chart to show the sequence of the entire process performed by the digital copying machine 200.

FIG. 5 is a flow chart showing the sequence of the entire process performed by the digital copying machine 200 of the present invention. With reference to this chart, when reset is performed as a result of the turning ON of power to the CPU 173, the main program sequence shown in FIG. 5 begins. First, the CPU 173 is initialized, which includes the clearing of the RAM and the setting of various registers (step S30). The existing mode in the printer PRT is then initialized (step S31). Initialization of the printer PRT mode is a process in which the copy magnification, darkness and paper size are reset to the default values stored in the ROM 171 in advance.

The CPU 173's built-in internal timer is then started (step S32). A default value is set beforehand in this internal timer during the initialization process in step S30.

Subsequently, a job control process in which the status of the current job is determined (step S33), a display process in which LCD and LED display takes place (step S34), an input process in which inputting from the numerical keypad 152 and the touch panel 151 on the liquid crystal display unit 156 is received (step S35), an auto-clear process in which the auto-clear timers 174 and 175 run and auto-clear is performed (step S36), and other processes (step S37) occur.

When all subroutines are completed, one entire routine is completed when the internal timer that was initially set expires (step S38), and the step S32 is returned to. Using the length of this entire routine, the number of times the main sequence has been repeated is counted by means of the timers 174 and 175. Therefore, the timers 174 and 175 do not directly measure the time, but instead, measure the time by multiplying the number of times the main sequence was repeated by the time set in the internal timer.

Using this method, the interrupt process that would be necessary when using timers that directly measure the time need not be used. In addition, because the timers 174 and 175 count the number of times the main sequence was executed, the threshold values for the timers 174 and 175 may be expressed in integers, making the setting of the timers 174 and 175 easy.

FIGS. 6(a) and 6(b) is a flow chart showing the sequence of the job control process shown in step S33 in FIG. 5. The current job is explained here. The current job refers to the job that is deemed to be the subject of current operation by the operator with regard to the digital copying machine 200. In contrast, jobs that are not the subject of the current operation are called sub-jobs.

With reference to FIGS. 6(a) and 6(b), in the job control process, it is determined whether or not the digital copying machine 200 is on hold (step S50). The digital copying machine 200 being 'on hold' means the situation where neither the image reader IR nor the printer PRT is operating. If the digital copying machine 200 is not on hold (NO in step S50), it is determined whether or not the image reader IR is operating (step S51). If the image reader IR is performing reading, the current job is deemed 'reading' (step S513) and the main sequence is returned to. If the image reader IR is not operating (NO in step S51), it is determined whether or not the printer PRT is operating (step S511). If the printer PRT is operating, the current job is deemed 'printing' (step S512). If the printer PRT is not operating (NO in step S511), nothing is specified as the current job and the main sequence is returned to.

Where the digital copying machine 200 is determined to be on hold in step S50 (YES in step S50), it is determined whether or not an error has occurred (step S52). An error is determined to have occurred when an error signal output from the image reader IR or the printer PRT is received by the CPU 173. It is determined whether the error signal received indicates an error in the printer PRT or an error in the image reader IR (steps S521 and S523). Where it is an error in the printer PRT (YES in step S521), 'printing' is specified as the current job (step S522) and the main sequence is returned to. Where it is an error in the image reader IR (NO in step S521 and YES in step 523), 'reading' is specified as the current job (step S524) and the main sequence is returned to. Where the error is neither in the printer PRT nor the image reader IR (NO in steps S521 and S523), it is determined that the error is a total system error (step S525). In this case, nothing is specified as the current job and the main sequence is returned to.

Where the digital copying machine 200 is on hold but is not on hold due to an error (YES in step S50 and NO in step S52), it is determined whether or not the digital copying machine 200 has been operated (step S53). It is determined whether or not the digital. copying machine 200 has been operated based on whether or not the operation panel 150 has been operated. Where the operation panel 150 has been operated (YES in step 53), it is determined whether the operation is for the job subject to processing by the printer PRT or for the job subject to processing by the image reader IR (steps S531 and S533). This determination as to whether the operation is for the job subject to processing by the printer PRT or for the job subject to processing by the image reader IR is made by determining which job is currently displayed in the liquid crystal display unit 156 of the operation panel 150.

Because the digital copying machine 200 performs the multi-job operation shown in FIG. 4, multiple jobs exist inside the digital copying machine 200. One of them is processed by the image reader IR, another one is processed by the printer PRT, and yet another one is stored in the image memory. An operation mode is specified in the digital copying machine 200 for the processing of each job. If a mode is not specified for any of these jobs, it may be set by means of inputting from the operation panel 150. In order to select a job existing in the digital copying machine 200, the reservation setting key 158 displayed in the liquid crystal display unit 156 of the operation panel 150 is pressed. A job selection screen is then displayed, showing all jobs existing in the digital copying machine 200, numbered in the order in which they were read by the image reader IR. The user may select a desired job from among the jobs thus displayed. Once the job selected by the user is known, it may be determined whether it is a job subject to processing by the image reader IR, a job subject to processing by the printer PRT or a job stored in the image memory 230.

Where the job displayed in the liquid crystal display unit 156 of the operation panel 150 is a job subject to processing by the printer PRT (YES in step S531), 'printing' is specified as the current job (step S532) and the main sequence is returned to. Where the job displayed in the liquid crystal display unit 156 is a job subject to processing by the image reader IR (NO in step S531 and YES in step S533), 'reading' is specified as the current job (step S534) and the main sequence is returned to. If the operation mode displayed in the liquid crystal display unit 156 is the one for a standby job stored in the image memory (NO in steps S531 and S533), nothing is specified as the current job and the main sequence is returned to.

Where the digital copying machine has not been operated (NO in step S53), it is determined whether or not the printer PRT suspended a printing operation or the image reader IR suspended a reading operation (steps S54 and S55). Whether the unit that suspended operation was the printer PRT or the image reader IR may be detected by the CPU 173 that controls these units. Cases where the printer PRT suspends operation include the situation in which the toner in the developing unit 273 runs out, the situation in which the sheets supplied from the paper cassette 280 are jammed in the device and the situation in which the stop key 154 of the operation panel 150 is pressed, for example. Cases where the image reader IR suspends operation include the situation in which the original document pages were not properly conveyed by the automatic original document feeder 500, the situation in which the storage capacity of the image memory 230 has become insufficient, and the situation in which the stop key 154 of the operation panel 150 is pressed, for example.

Where both the printer PRT and the image reader IR have suspended operation (YES in steps S54 and S541), it is determined that both the printing and reading operations are suspended (step S542), whereupon nothing is specified as the current job and the main sequence is returned to. Where only the printer PRT has suspended operation (YES in step S54 and NO in step S541), 'printing' is specified as the current job (step S543) and the main sequence is returned to. Where only the image reader IR has suspended operation (NO in step S54 and YES in step S55), 'reading' is specified as the current job (step S551) and the main sequence is returned to. Where neither the printer PRT nor the image reader IR has suspended operation (NO in steps S54 and S55), it is determined that the digital copying machine 200 is on standby (step S552), whereupon nothing is specified as the current job and the main sequence is returned to.

As described above, in the job control process, the current job is determined based on the status of the image reader IR, the status of the printer PRT and the operation of the operation panel 150. The operation mode for the current job determined in this process is displayed in the liquid crystal display unit 156 of the operation panel 150.

FIG. 7 is a flow chart showing the sequence of the key input process. The key input process is the process to specify the job subject to processing by the image reader IR as the current job by pressing the reservation setting key 158 displayed in the liquid crystal display unit 156. With reference to the chart, it is determined whether or not the reservation setting key 158 displayed in the liquid crystal display unit 156 is pressed (step S61). The pressing of the reservation setting key 158 is detected by the touch panel 151. Where the reservation setting key 158 is not pressed (NO in step S61), the processes assigned to other keys when they are pressed are performed (step S62). For example, where the numerical keypad 152 is pressed, the number representing the pressed keys is set as the number of copies.

Where the reservation setting key 158 is pressed (YES in step S61), it is determined whether or not the current job is specified as 'printing' and the image reader IR is not operating (step S63). If these conditions are met (YES in step S63), 'reading' is specified as the current job (step S64). If the conditions are not met (NO in step S63), no further steps take place and the routine comes to an end.

Through this routine, where it is desired to set an original document and operate the image reader IR when the image reader IR is not operating and only the printer PRT is operating, the process to specify the current job as 'reading' is carried out.

Therefore, if the reservation setting key 158 is pressed while only the printer PRT is operating, the printing default values are displayed in the liquid crystal display unit 156, enabling the input operation to change the settings. When the start key 155 is pressed, reading of the original document is begun in the specified operation mode.

FIG. 8 is a flow chart showing the sequence of the display process. With reference to the chart, in the display process, the routine for LED display is first carried out (step S70). The LED display routine is the process to control the LEDs located at the bottom of the start key 153, stop key 154 and panel reset key 157 of the operation panel 150. For example, when the start key 155 is enabled, the LED is illuminated green and when it is disabled, the LED is illuminated red. Based on the LED, the start button 155 becomes illuminated red or green, and therefore the operator may recognize whether the start button is enabled by observing the color of the LED. The LEDs for the stop key 154 and the panel reset key 157 are also illuminated red or green in the same manner.

The LCD display routine then takes place (step S71). The LCD display routine is the process to control the screen displayed on the liquid crystal display unit 156 of the operation panel 150.

While the main routine is being performed once, the display process is also performed once and the LED status and the display contents in the liquid crystal display unit 156 change in this manner.

FIG. 9 is a flow chart showing the sequence of the process to display an operation mode in the liquid crystal display unit 156 of the operation panel 150. With reference to the chart, the contents of the display to be displayed in the liquid crystal display unit 156 are determined based on the current job that is determined in the job control process. Where the current job is 'reading' (YES in step 80), the operation mode for the reading job is displayed in the liquid crystal display unit 156 (step S87). A reading job is a job subject to processing by the image reader IR, and therefore, the operation mode specified for the process in which the original document is read and image data is output is displayed. Where no operation mode is specified, the default operation mode is displayed.

Where the current job is 'printing' (YES in step S81), the operation mode for the job subject to processing by the printer PRT is displayed in the liquid crystal display unit 156 (step S88). A print job is the process in which image data stored in the image memory 230 is printed on a sheet of copy paper by the printer PRT, and the operation mode for a print job refers to the printing darkness, the magnification, the paper size to be used, whether sorting or stapling is to be performed to the printed sheets, whether printing is to be performed on one side or both sides of the sheet, etc.

Where nothing is specified as the current job and a total system error is determined to exist (YES in step S82), a total system error display is shown in the liquid crystal display unit 156 (step S86). A total system error is a situation in which errors have occurred both in the image reader IR and the printer PRT, and a message such as 'Printer/Image Reader Error' is displayed in the liquid display unit 156.

Where nothing is specified as the current job and it is determined that operation was suspended in both the image reader IR and the printer PRT (YES in step S83), this determination is displayed in the liquid crystal display unit 156 (step S85). The display indicates a situation in which both the image reader IR and the printer PRT are put on hold. Suspension of an operation is implemented when the stop key 154 is pressed to stop the operation of the current job. For example, if the stop key 154 is pressed while the current job displayed in the liquid display unit 156 is a print job, the printing operation becomes suspended. When a print job, which is the current job, is displayed in the liquid crystal display unit 156, by pressing the reservation setting key 158, a reading job may be made the current job by selecting it from the job list that is displayed, and then by pressing the stop key 154, the reading job may be suspended.

When both the reading and printing operations are suspended, the message 'Operation in Image Reader and Printer Suspended' is displayed in the liquid crystal display unit 156.

Where none of the above situations applies (NO in step S83), it is indicated that nothing is set as the current job and the apparatus is standing by, and therefore the message 'Standby' is displayed (step S84). The 'Standby' display refers to a situation in which no image data is stored in the image memory 230 and neither the image reader IR and printer PRT is operating, which therefore is a situation where the digital copying machine is not operating. In this case, the standby status is displayed by means of a message such as 'Standby' in the liquid crystal display unit 156.

As described above, where the current status of the digital copying machine is displayed in the liquid crystal display unit 156, and particularly where there are multiple jobs to be processed by the digital copying machine, because the operation mode for the current job is displayed, the operator may visually determine the status of the digital copying machine. In addition, because the current job operation displayed in the liquid crystal display unit 156 may be discontinued by pressing the stop key 154, the operation currently being performed by the image reader IR or the printer PRT may be suspended.

The auto-clear process will now be explained. The auto-clear process is the process by which (i) when the processing of a job subject to processing by the image reader IR is suspended due to intentional discontinuation or an error, or when the setting of the operation mode for a job subject to processing by the image reader IR is left unfinished, the operation mode is cleared, or (ii) similarly, when the processing of a job subject to processing by the printer PRT is suspended due to intentional discontinuation or an error, or when the setting of an operation mode for a job subject to processing by the printer PRT is left unfinished, the operation mode is cleared.

Here, the operation mode refers to the printing darkness, the magnification, the paper size to be used, whether sorting or stapling is to be performed to the printed sheets, whether printing is to be performed on one side or both sides of the sheet, etc. Clearing an operation mode refers to returning the values set for the operation parameters to the default values. FIGS. 10 and 11 are flow charts showing the sequence of the auto-clear process. In the charts, FREAD is a flag that shows whether or not the image reader IR is operating. Where FREAD is '0', it is indicated that the image reader IR is not operating, and where FREAD is '1', it is indicated that the image reader IR is operating. FREAD off-edge means that it has been detected that one original document has been read and image data has been output, and is thus detected when the FREAD flag changes from '1' to '0'. Once FREAD off-edge is detected, another FREAD off-edge is not detected until the FREAD flag changes from '1' to '0' again. FREAD off-edge is detected the same number of times as the number of pages of the original document read by the image reader IR. Therefore, through the detection of FREAD off-edge the same number of times as the number of pages of the original document, where the number of pages of original document to read is specified, it can be confirmed that all of the original document pages have been read.

Where the FREAD flag is remaining at '0' and no FREAD off-edge is detected, it is indicated that the image reader IR is not operating. A situation where the image reader IR is not operating refers to a situation in which the operation of the image reader IR has been suspended due to intentional discontinuation or due to an error.

FKEY is a flag that indicates whether or not a key on the operation panel 150 is being pressed. Where FKEY is '1', it is indicated that a key is being pressed, and where FKEY is '0', it is indicated that no keys are being pressed. FKEY off-edge is detected when the FKEY flag changes from '1' to '0'. In addition, once it is determined that FKEY off-edge is detected, another FKEY off-edge is not detected until the FKEY flag changes from '1' to '0' once more. Therefore, FKEY off-edge is detected the same number of times as the number of times that a key on the operation panel is pressed. Further, where the FKEY flag is remaining at '0' and no FKEY off-edge is detected, it is indicated that the setting of the operation mode by means of the operation panel 150 was left unfinished.

FPRINT is a flag that indicates whether or not the printer PRT is operating. When FPRINT is '0', it is indicated that the printer PRT is not operating, and when FPRINT is '1', it is indicated that the printer PRT is operating. In addition, FPRINT off-edge is detected when the printing operation by the printer PRT is completed. In other words, it is detected when the FPRINT flag changes from '1' to '0'. Once it is determined that FPRINT off-edge is detected, another FPRINT off-edge is not detected until the FPRINT flag changes from '1' to '0' again. FPRINT off-edge is detected the same number of times as the number of sheets of copy paper printed by the printer PRT. Therefore, FPRINT off-edge is detected the same number of times as the number of pages of image data stored in the image memory 230, it may be known that all image data has been output.

RTIME is a variable measured by the timer 174 and PTIME is a variable measured by the timer 175. TSET and TEST 1 are constants set in the RTIME and PTIME variables, respectively. TSET is smaller than TEST 1. Variables RTIME and PTIME are variables from which 1 is subtracted each time one routine of the main sequence shown in FIG. 5 is completed.

With reference to FIG. 10, it is determined whether or not the FREAD flag is '0' (step S900). If the FREAD flag is '1', i.e., if the image reader IR is operating, step S940 is performed. If the FREAD flag is '0', i.e., if the image reader IR is not operating (YES in step S900), it is determined whether or not FREAD off-edge is detected (step S901). In other words, it is determined whether or not the output of image data for one page of the original document is detected. If FREAD off-edge is detected (YES in step S901), the constant TSET is set for the variable RTIME, whereupon the variable RTIME is reset (step S902). Step S930 is then performed. In step 902, the setting of the constant TSET for the variable RTIME indicates that the timer 174 is reset each time one page of the original document is read by the image reader IR and image data is output.

If FREAD off-edge is not detected (NO in step S901), determination regarding the FKEY flag takes place (step S910). Where the FKEY flag is not '0', i.e., where a key of the operation panel is being pressed, step S940 is then performed. Where the FKEY flag is '0' (YES in step S910), i.e., where no keys of the operation panel are being pressed, it is determined whether or not FKEY off-edge is detected (step S911). If FKEY off-edge is detected (YES in step S911), it is determined whether or not the current job is 'reading' (step S920). If the current job is 'reading', the sequence advances to step S902 in which the timer 174 is reset.

Where FKEY off-edge is not detected in step S911, or where it is detected but the current job is not 'reading', step S921 is then performed. In step S921, 1 is subtracted from the variable RTIME. Consequently, where the operation of the image reader IR has been suspended due to either intentional discontinuation or an error, and as long as no keys of the operation panel 150 are being pressed, 1 is continuously subtracted from the variable RTIME. It is then determined in step S930 whether or not the variable RTIME is '0'. If it is '0' (YES in step S930), the reading job is cancelled. In other words, the operation mode for the job subject to processing by the image reader IR is initialized. It is also acceptable if the image data for that job is deleted from the image memory 230.

Where RTIME is not '0' in step S930, step S940 is then performed.

With reference to FIG. 11, it is determined in step S940 whether or not the FPRINT flag is '0'. Where it is '1', i.e., where the printer PRT is operating, the auto-clear process is completed and the main sequence is returned to. Where the FPRINT flag is '0' (YES in step S940), i.e., where the printer PRT is not operating, it is determined whether or not FPRINT off-edge is detected (step S941). Where FPRINT off-edge is detected (YES in step S941), step S942 is then performed, in which the constant TSET is set for the variable PTIME (step S942). This resets the timer 175.

Where FPRINT off-edge is not detected (NO in step S941), it is determined whether or not the FKEY flag is '0' (step S950). Where it is not '0', i.e., where a key of the operation panel 150 is being pressed, the main sequence is returned to.

Where the FKEY flag is '0' (YES in step S950), i.e., where no keys of the operation panel 150 are being pressed, it is determined whether or not FKEY off-edge is detected (step S951). Where FKEY off-edge is detected (YES in step S951), it is determined whether or not the current job is 'printing' (step S952). Where the current job is 'printing' (YES in step S952), the constant TSET is set for the variable PTIME in step S942. This resets the timer 175. In this way, where image data for one page has been printed by the printer PRT or where no printing has been performed and a key of the operation panel 150 is pressed, the timer 175 is reset.

On the other hand, where FKEY off-edge is not detected (NO in step S951) or where FKEY off-edge is detected but the current job is not 'printing', 1 is subtracted from the variable PTIME (step S953). The situation in which the current job is not 'printing' in step S952 refers to the situation in which keys irrelevant to the operation mode setting for the processing performed by the printer PRT are being pressed on the operation panel 150.

Therefore, where the operation of the printer PRT has been suspended due to either intentional discontinuation or an error, and as long as no operation mode setting for the image data subject to processing by the printer PRT is made from the operation panel 150, 1 is continuously subtracted from the variable PTIME.

It is then determined in step S960 whether or not the variable PTIME is '0'. Where it is '0', the operation mode for the job subject to processing by the printer PRT is initialized and that job is cancelled (step S961). It is also acceptable if the image data for that job is deleted from the image memory 230. Where variable PTIME is not '0', the main sequence is returned to and no other processes are performed. As explained above, in the digital copying machine of the present invention, when the operation of the image reader IR has been suspended or where setting of the operation mode for the job subject to processing by the image reader IR is not being performed from the operation panel 150, the timer 174 measures the period of time over which this suspension or lack of operation continues. When the period of time measured by the timer 174 reaches a prescribed period (TSET), the image reader IR process is initialized. In other words, the job subject to processing by the image reader IR is cancelled and the operation mode is initialized. The image data read up to that point is also deleted from the image memory 230.

Further, the period of time in which the operation of the printer PRT has been suspended or in which setting of the operation mode for the job subject to processing by the printer PRT is being performed from the operation panel 150 is measured by the timer 175. When the period of time measured by the timer 175 reaches a prescribed period (TSET), the job subject to processing by the printer PRT is cleared. This initializes the operation mode for the image data for that job. The image data for that job is also deleted from the image memory 230.

As described above, using the timer 174 that measures the period of time over which the process performed by the image reader IR is put on hold and the timer 175 that measures the period of time over which the process performed by the printer PRT is put on hold, said timers running independently of each other, even when one of the processes is continuing, if the other process is suspended due to either intentional discontinuation or an error, this other process may be cleared. As a result, an operator who wishes to input a job to the digital copying machine can learn the current status of each job residing in the digital copying machine, and in particular, the problem of the image reader IR being left unattended with its operation being suspended due to intentional discontinuation or an error may be eliminated. Consequently, the operator may immediately input a job into the digital copying machine.

FIGS. 12 and 13 are flow charts showing a modification of the auto-clear process. With reference to the charts, the auto-clear process of this modification has an operation sequence comprising the auto-clear process shown in FIG. 10 plus steps S902' and S942'. Because this modified auto-clear process is identical to the auto-clear process shown in FIGS. 10 and 11 other than these two additional steps, the identical steps will not be explained again. In the modified auto-clear process shown in FIGS. 12 and 13, two constants, i.e., TSET and TEST 1, are used as the constants to reset the timers 174 and 175. A smaller value is set for TSET than is set for TEST 1.

With reference to FIG. 12, where FREAD off-edge is detected in step S901, step S902' is performed, and where the current job is determined to be 'reading' in step S902, step S902 is performed. This is achieved by using different periods of time to reset the timer 174 between the moment at which the output of image data by the image reader IR is detected and the time at which setting of an operation mode for the image data subject to processing by the image reader IR is performed from the operation panel 150. Therefore, where image data is output by the image reader IR, the image reader IR is allowed to remain in a suspended state when the suspension is due to either intentional discontinuation or an error for a longer period of time than when the operation to set the operation mode is left unfinished.

With reference to FIG. 13, where FPRINT off-edge is detected in step S941, step S942' is performed, and where the current job is determined to be 'printing' in step S952, step S942 is performed. In step S942, the timer 175 is reset by setting the constant TSET for the variable PTIME, and in step S942', the timer 175 is reset by setting the constant TSET1 for the variable PTIME. The constants set for the variable PTIME are different in steps S942 and step S942'. Consequently, where image data for one page is output by the printer PRT, the printer PRT is allowed to remain in a suspended state when the suspension is due to either intentional discontinuation or an error for a longer period of time than when the operation to set the operation mode is left unfinished.

By allowing the image reader IR or the printer PRT to stay longer in the suspended state before the suspended job is cleared when the suspension is caused by intentional discontinuation than when setting of the operation mode is left unfinished, as described above, a flexible auto-clear process may be attained. As a result, a convenient digital copying machine may be provided.

Further, the job subject to auto-clear may be limited to the current job only. In this case, because only the current job—i.e., the job as to which the operation mode is displayed in the liquid crystal display unit 156 of the operation panel—is cleared, sub-jobs that are not the current job are not cleared. Consequently, only the job as to which the operator left the setting of an operation mode via the liquid crystal display unit 156 unfinished may be cleared.

Furthermore, it is also possible to modify the auto-clear process such that the period of time before sub-jobs are cleared is extended by making the period of time that should be measured before the sub-jobs are cleared longer than the period of time that is measured before the current job is cleared. By doing so, the period of time before the sub-jobs for which the operation modes cannot be recognized by the user through the liquid crystal display unit 156 are cleared may be made longer.

[Second Embodiment]

The digital copying machine 200 comprising a second embodiment is the digital copying machine of the first embodiment to which an original document tray unit is added. The other hardware components are the same as the digital copying machine 200 of the first embodiment, and therefore will not be explained again. FIG. 14 is a simplified cross-sectional view showing the basic construction of the digital copying machine 200 of the second embodiment. With reference to FIG. 14, the digital copying machine 200 of the second embodiment has an original document tray unit 510.

The original document tray unit 510 has multiple original document trays 511 through 515, and is supported by an automatic original document feeder 500. The original document tray unit 510 is connected to the automatic original document feeder 500 such that it can move up and down (in vertical directions in the sheet bearing the drawing) while driven by a motor not shown in the drawing. A set of original documents to be copied using the digital copying machine 200 may be placed in each of the original document trays 511 through 515.

When the original document tray unit 510 is at the position shown in FIG. 14 (deemed the home position), the original document set in the original document tray 511 is supplied to the automatic original document feeder 500. When the original document tray unit 510 is moved downward by means of the drive motor and the original document tray 512 is at the position at which the original document tray 511 was located when in the home position, the original document set in the original document tray 512 is supplied to the automatic original document feeder 500 page by page. Similarly, the original document set in each of the original document trays 513 through 515 is supplied to the automatic original document feeder 500 when the original document tray unit 510 is moved downward by means of the drive motor and each of the original document trays is positioned at the position at which the original document tray 511 was located when in the home position.

The processes performed by the digital copying machine 200 of the second embodiment are identical to those in the digital copying machine 200 of the first embodiment except for the auto-clear process, and therefore will not be explained again.

FIG. 15 is a flow chart showing the sequence of the auto-clear process performed by the digital copying machine of the second embodiment. With reference to the chart, in the auto-clear process, it is first determined whether or not operation mode reservation is being set for any of the original document trays 511 through 515 of the original document tray unit 510 (step S1001). Operation mode reservation refers to an operation in which the operation mode for the original document that is set or will be set in an original document tray is specified in advance prior to performing processing. The auto-clear process is separately performed for each of the five original document trays 511 through 515. The auto-clear process performed for the original document tray 511 will be explained here. Therefore, in step S1001, it is determined whether or not operation mode reservation is being set for the original document tray 511 through the operation panel 150. Where it is not being set, it is determined whether or not operation mode reservation has already been set for the original document set in the original document tray 511 (step S1003), and where it has not already been set, the auto-clear process need not be performed and the routine comes to an end.

Where operation mode reservation is being set for the original document tray 511 (YES in step S1001), it is determined whether or not a key of the operation panel 150 is being pressed (step S1002). Where a key of the operation panel 150 is being pressed (NO in step S1002), it is indicated that operation mode reservation is still being set, and therefore the routine comes to an end. Where no keys of the operation panel 150 are being pressed (step S1002), it is indicated that the setting of operation mode reservation has been left unfinished, and it is therefore determined whether or not an original document is set in the original document tray 511 (step S1004). In addition, where it is determined that reservation has already been set for the original document tray 511 in step S1003, it is determined whether or not an original document is set in the original document tray 511 in step S1004 as well. This determines whether or not the digital copying machine 200 was left unattended without an original document after reservation setting was made.

Where an original document is set in the original document tray 511 (YES in step S1004), the auto-clear process need not be performed and the routine comes to an end.

Where no original documents are set in the original document tray 511, it is determined whether or not FKEY off-edge is detected (step S1005). Where FKEY off-edge is detected (YES in step S1005), the timer is reset by setting the constant TEST 1 for the variable ATIMEn (step S1007).

Where FKEY off-edge is not detected (NO in step S1005), 1 is subtracted from the variable ATIMEn (step S1006). As a result, where operation mode reservation setting is left unfinished for an original document to be set in the original document tray 511 or where reservation has already been set but no original documents are set in the original document tray 511, 1 is continuously subtracted from the variable ATIMEn. In step S1008, it is determined whether or not the variable ATIMEn is '0'. Where it is '0', the reservation set for the original document tray 511 is discarded (step S1009).

As a result, where operation mode reservation setting for the original document tray 511 is left unfinished or where operation mode reservation is already set for the original document tray 511 but no original documents are set in the original document tray 511 within a prescribed period of time, the reservation is discarded.

As described above, using the digital copying machine 200 of the second embodiment, processing using the reserved operation mode is possible only for original document trays 511 through 515 in which an original document is set, and therefore, operation mode reservation setting cannot be left unfinished for a long time or a reserved operation mode is not kept valid for an original document tray in which no original documents are placed. Consequently, the digital copying machine may be efficiently used.

The embodiments disclosed in this patent application are simply examples of all aspects of the present invention, which should not be considered to be limited to these embodiments. The scope of the present invention is indicated not by means of the explanations given above but by means of the claims, and intends to include all modifications within the essence and scope of the claims.

What is claimed is:

1. An image forming apparatus comprising:
    a memory;
    an input unit for performing an input process which inputs a first image group to the memory;
    an output unit for performing an output process which outputs a second image group stored in the memory independently of the input process;
    a first timer which measures a period of time that has elapsed since the input process is suspended; and
    a second timer which measures a period of time that has elapsed since the output process is suspended.

2. An image forming apparatus as claimed in claim 1, wherein said output unit includes a printer which prints an image on a sheet.

3. An image forming apparatus as claimed in claim 1, wherein said input unit includes an image reader which reads a image of an original document.

4. An image forming apparatus as claimed in claim 1, wherein said input unit includes an interface which receives the first image group from an external apparatus.

5. An image forming apparatus as claimed in claim 1, further comprising:
    a canceling means which cancels the input process for the first image group when the first timer has measured a first period of time.

6. An image forming apparatus as claimed in claim 5, wherein said canceling means initializes operation modes set for the first image group.

7. An image forming apparatus as claimed in claim 5, wherein said canceling means deletes the first image group from the memory.

8. An image forming apparatus as claimed in claim 1, further comprising:
    a canceling means which cancels the output process for the second image group when the second timer has measured a second period of time.

9. An image forming apparatus as claimed in claim 8, wherein said canceling means deletes the second image group from the memory.

10. An image forming apparatus as claimed in claim 1, further comprising:
    a reset means which resets the first timer when the input process of the first image group is performed by the input unit, and resets the second timer when the output process of the second image group is performed by the output unit.

11. An image forming apparatus as claimed in claim 10, wherein said reset means resets the first timer when the input unit has completed an input operation for at least one image of the first image group, and resets the second timer when the output unit has completed an output operation for at least one image of the second image group.

12. An image forming apparatus as claimed in claim 10, further comprising:
    an operating member setting an information for the first or the second image group,
    wherein when an operation of the operation member is detected, said reset means resets the first timer if the first image group is a target image group of the operation and resets the second timer if the second image group is a target image group of the operation.

13. An image forming apparatus as claimed in claim 12, further comprising:
    a canceling means which cancels a process for the first image group when the first timer has measured a third period of time, and cancels a process for the second image group when the second timer has measured the third period of time.

14. An image forming apparatus as claimed in claim 1, further comprising:
    a selector which selects one image group from the first or the second image groups; and
    a display which displays an information for the selected image group.

15. An image forming apparatus comprising:
    a plurality of original document trays;
    a copying device which copies original documents placed on the original document trays;
    an operating member which sets copying parameters for each of the original document trays;
    a timer which measures a period of time that has elapsed since the parameters are set by the operating member;
    a detector which detects that an original document is placed on the original document tray for which the parameters have been set; and
    a clearing means for clearing the parameters set by the operating member, when the period of time measured by the timer has exceeded a prescribed period of time before the detector detects placement of the original document.

16. An image forming apparatus comprising:

a memory;

an input unit which inputs an image group for a first job;

a printer which prints an image group for a second job stored in the memory independently of the image group regarding the first job;

a first timer which measures a period of time that has elapsed since the input of the image group for the first job is suspended; and a second timer which measures a period of time that has elapsed since the printing of the image group for the second job is suspended.

17. An image forming apparatus as claimed in claim 16, further comprising:

a canceling means which cancels the first job when the first timer has measured a predetermined period of time.

18. An image forming apparatus as claimed in claim 16, further comprising:

a canceling means which cancels the second job when the second timer has measured a predetermined period of time.

19. An image forming apparatus as claimed in claim 16, further comprising:

a reset means which resets the first timer when the input of the image group for the first job is performed by the input unit, and resets the second timer when the printing of the image group for the second job is performed by the printer.

20. An image forming apparatus as claimed in claim 19, wherein said reset means resets the first timer when the input unit has completed an input operation for at least one image of the first job, and resets the second timer when the printer has completed an printing operation for at least one image of the second job.

* * * * *